(12) United States Patent
Matsuda et al.

(10) Patent No.: US 11,409,188 B2
(45) Date of Patent: Aug. 9, 2022

(54) CAMERA AND SUCTION CUP APPARATUS (71) Applicant: Panasonic Intellectual Property Management Co., Ltd., Osaka (JP)

(72) Inventors: Junichi Matsuda, Fukuoka (JP); Jumpei Hironaka, Fukuoka (JP); Takashi Kihara, Fukuoka (JP); Yasuhiro Nomiyama, Fukuoka (JP); Ryota Takeshige, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/322,305

(22) Filed: May 17, 2021

(65) Prior Publication Data

US 2021/0364893 A1    Nov. 25, 2021

(30) Foreign Application Priority Data

May 20, 2020    (JP) .............................. JP2020-088108

(51) Int. Cl.
*G03B 17/56*    (2021.01)
*F16B 47/00*    (2006.01)

(52) U.S. Cl.
CPC ............ *G03B 17/561* (2013.01); *F16B 47/00* (2013.01)

(58) Field of Classification Search
CPC .............................. G03B 17/561; F16B 47/00
See application file for complete search history.

(56) References Cited

U.S. PATENT DOCUMENTS

| | | | |
|---|---|---|---|
| 2016/0119514 A1* | 4/2016 | Sugimura | B60R 25/305 348/148 |
| 2018/0274722 A1* | 9/2018 | Worden, IV | F16B 47/003 |
| 2018/0284577 A1* | 10/2018 | Furutake | G03B 17/12 |
| 2020/0019044 A1* | 1/2020 | Comeau | B60R 11/00 |
| 2020/0109813 A1* | 4/2020 | Geerds | F16B 47/00 |

FOREIGN PATENT DOCUMENTS

| | | |
|---|---|---|
| JP | 3032809 | 1/1997 |
| JP | 2007-025967 | 2/2007 |

* cited by examiner

*Primary Examiner* — Christopher E Mahoney
(74) *Attorney, Agent, or Firm* — Greenblum & Bernstein, P.L.C.

(57) ABSTRACT

A camera fixed by suction to a transparent member and configured to capture an image through the transparent member includes: a planar portion having an opening; an auxiliary member attached to a surface of the planar portion and including a hole formed therein, the hole communicating with the opening of the planar portion, the auxiliary member having a plate shape and being brought into contact with the transparent member; and a suction portion causing the auxiliary member to be attached by suction to the transparent member by forming a negative pressure in the opening of the planar portion, in which the auxiliary member is softer than a material of the planar portion.

9 Claims, 8 Drawing Sheets

CAMERA AND SUCTION CUP APPARATUS

CROSS REFERENCE TO RELATED APPLICATIONS

This application is entitled to and claims the benefit of Japanese Patent Application No. 2020-088108, filed on May 20, 2020, the disclosure of which including the specification, drawings and abstract is incorporated herein by reference in its entirety.

TECHNICAL FIELD

The present disclosure relates to a camera and a suction cup apparatus.

BACKGROUND ART

Patent Literature (hereinafter, referred to as "PTL") 1 discloses a camera unit which is fixed to a planar transparent member, such as a window glass. This camera unit is used in traffic flow measurement systems. The camera unit includes: an imager; a suction cup which is a fixture for fixedly attaching the camera unit to the transparent member; and a reflection preventer for preventing capturing of reflection light reflected from the transparent member in the captured image, in which the camera unit is installed in an interior of a construction including a window sectioned by the transparent member in the vicinity of a road and captures an image of the road.

PTL 2 discloses a hook with a suction cup having a structure that increases a suction force using the principle of leverage when an object is placed on the hook.

CITATION LIST

Patent Literature

PTL 1
Japanese Patent Application Laid-Open No. 2007-25967
PTL 2
Japanese Utility Model (Registration) Application No. H08-7359

SUMMARY OF INVENTION

Technical Problem

The suction force of the suction cup decreases with the passage of time. Such a decrease in the suction force of the suction cup of the camera possibly causes the following: the camera is shifted in its installation position with respect to the transparent member; and/or the camera falls off from the transparent member, for example.

One non-limiting and exemplary embodiment facilitates providing a camera and a suction cup apparatus each suppressing a decrease in suction force with respect to a transparent member.

Solution to Problem

A camera according to one example of the present disclosure is a camera fixed by suction to a transparent member and configured to capture an image through the transparent member, the camera including: a planar portion having an opening; an auxiliary member attached to a surface of the planar portion and including a hole formed therein, the hole communicating with the opening of the planar portion, the auxiliary member having a plate shape and being brought into contact with the transparent member; and a suction portion causing the auxiliary member to be attached by suction to the transparent member by forming a negative pressure in the opening of the planar portion, in which the auxiliary member is softer than a material of the planar portion.

A suction cup apparatus according to one example of the present disclosure is an apparatus fixed by suction to a planar member, the suction cup apparatus including: a planar portion having an opening; an auxiliary member attached to a surface of the planar portion and including a hole formed therein, the hole communicating with the opening of the planar portion, the auxiliary member having a plate shape and being brought into contact with the planar member; and a suction portion causing the auxiliary member to be attached by suction to the planar member by forming a negative pressure in the opening of the planar portion, in which the auxiliary member is softer than a material of the planar portion.

Advantageous Effects of Invention

According to one example of the present disclosure, it is made possible to suppress a decrease in suction force with respect to a transparent member.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, an embodiment of the present invention will be described in detail with reference to the drawings as appropriate. However, a detailed description more than necessary may be omitted, such as a detailed description of an already well-known matter and/or a duplicate description for a substantially identical configuration in order to avoid unnecessary redundancy of the following description and also to facilitate understanding by the person skilled in the art.

Note that, the accompanying drawings and the following description are provided for the person skilled in the art to sufficiently understand the present disclosure, and are not intended to limit the subject matter described in the claims.

Figure 1:
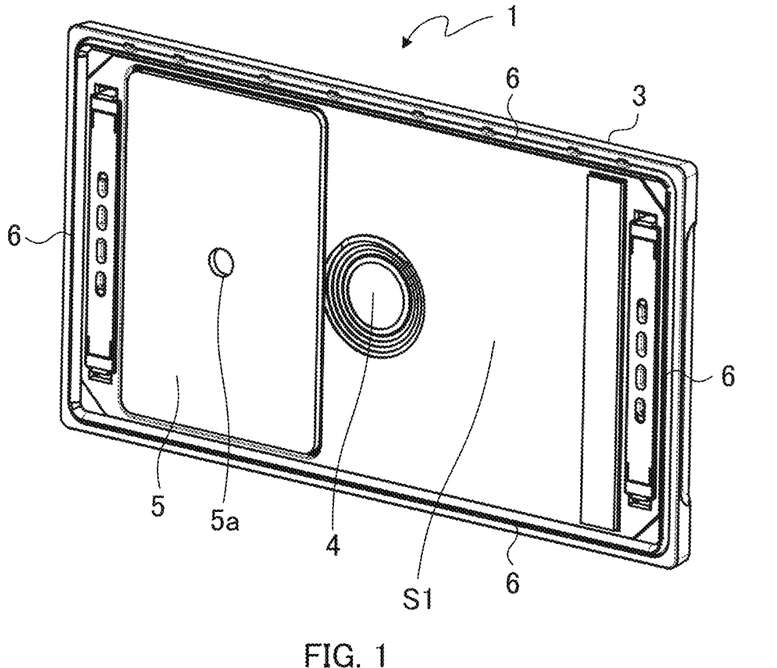
FIG. 1 is a front side perspective view of a camera according to an embodiment of the present disclosure.
Figure 2:
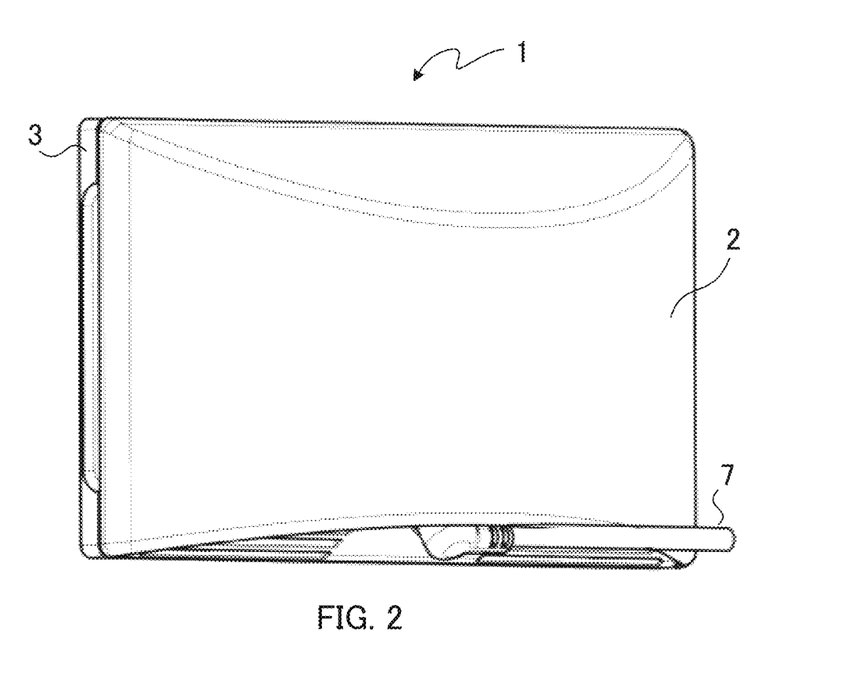
FIG. 2 is a rear side perspective view of the camera.

FIG. 1 is a front side perspective view of camera 1 according to an embodiment of the present disclosure. FIG. 2 is a rear side perspective view of camera 1. In FIGS. 1 and 2, the same components are denoted by the same reference numerals.

As illustrated in FIG. 2, camera 1 has cover 2, and casing 3. Cover 2 has a shape that covers the rear side of camera 1, and includes an opening on the front side thereof. Casing 3 has a rectangular frame shape as illustrated in FIGS. 1 and 2.

Figure 3:
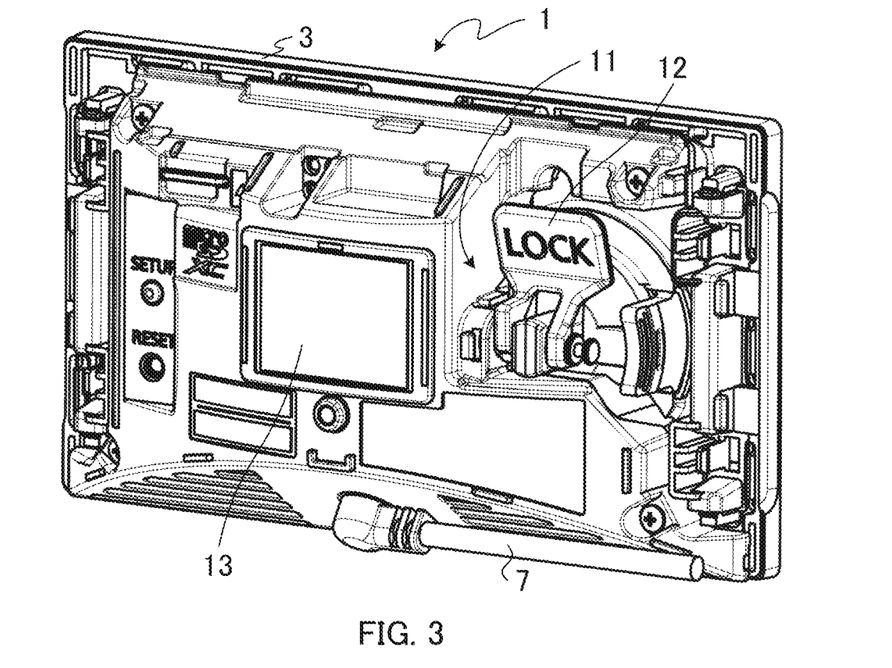
FIG. 3 is a rear side perspective view of the camera without a cover.
Figure 4:
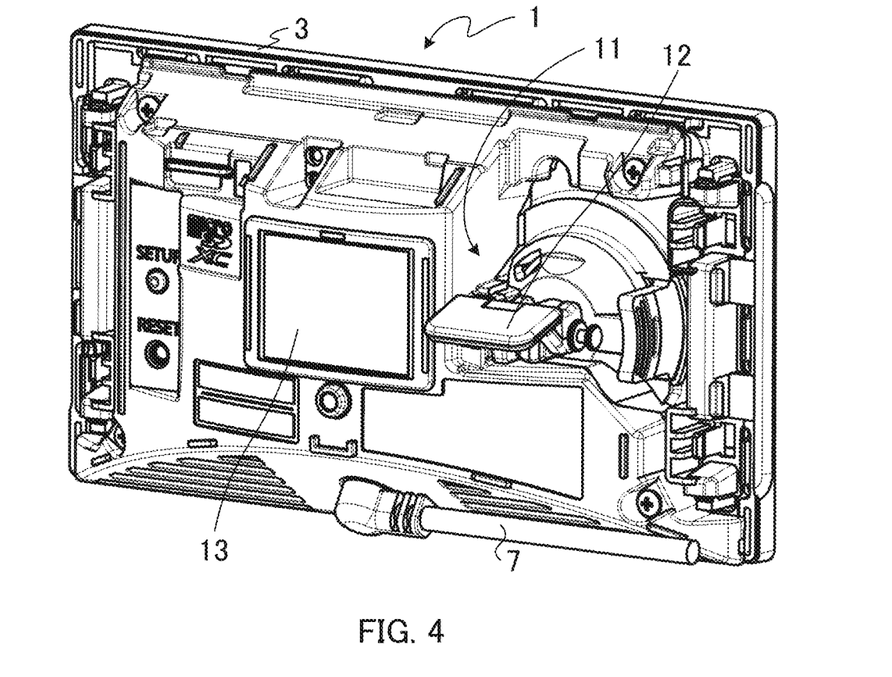
FIG. 4 is another rear side perspective view of the camera without the cover.

The opening of cover 2 has a shape along an outer shape (contour) of casing 3. The opening of cover 2 has a rectangular shape, for example. Cover 2 is attached to and detached from casing 3 in the opening portion of cover 2. In other words, cover 2 is removable from casing 3. FIGS. 3 and 4 each illustrate a state where cover 2 is removed from casing 3.

As illustrated in FIG. 1, camera 1 includes imager 4, suction cup auxiliary member 5, and lip 6. Imager 4 and suction cup auxiliary member 5 are housed in cover 2 and casing 3. Lip 6 is provided over the entire circumference of casing 3 on the front side of casing 3.

Imager 4 is disposed on the intersection of two diagonals of casing 3 having a rectangular shape, for example. In other words, imager 4 is placed at a center portion of casing 3 when viewed from the front side of casing 3. Casing 3 may be formed with the same aspect ratio as that of an imaging region of imager 4, for example.

Camera 1 is fixed by suction to the transparent member, such as a window glass, on the front side of camera 1, for example. In other words, camera 1 is fixed by suction to the transparent member while suction cup auxiliary member 5 and lip 6 are brought into contact with the transparent member. Incidentally, surface 51 of camera 1 on the right side of imager 4 is placed at a position recessed from the edge of the front side of casing 3 and makes no contact with the transparent member.

The capturing direction of imager 4 faces the front direction of camera 1. Therefore, camera 1 which is fixed by suction to the transparent member captures an image through the transparent member. Camera 1, for example, may be used as a surveillance camera.

Suction cup auxiliary member 5 is a plate-shaped member having a rectangular shape, and both surfaces are flat. Suction cup auxiliary member 5 is soft, and for example, is formed of silicon having a hardness of 5 or greater and 30 or less. Suction cup auxiliary member 5 is formed of, preferably, silicon having a hardness of 5 or greater and 20 or less.

Suction cup auxiliary member 5 is placed so as not to overlap with imager 4. Suction cup auxiliary member 5 is placed on the left side of imager 4 when viewed from the front side of camera 1, for example. Suction cup auxiliary member 5 has hole 5a having a circular shape in a central portion of suction cup auxiliary member 5.

Lip 6 is provided in casing 3 so as to protrude on the front side of camera 1. Lip 6 is formed of, for example, a material that is elastic, such as rubber, and that does not transmit light. Lip 6 suppresses, for example, interior light from entering between casing 3 and the transparent member when camera 1 is fixed by suction to the transparent member.

Note that, wiring 7 to be attached to and detached from camera 1 is illustrated in FIG. 2. Camera 1 is supplied with a power source via wiring 7, for example. Camera 1 may transmit a video signal of imager 4 to another apparatus via a radio communication, such as Wi-Fi (registered trademark) and/or may transmit the video signal of imager 4 to another apparatus via wiring 7.

Although the opening of cover 2 and casing 3 are each formed to have a rectangular shape, but the shapes of the opening of cover 2 and casing 3 are not limited thereto. The shapes of the opening of cover 2 and casing 3 may be square, circular, or elliptical.

FIG. 3 is a rear side perspective view of camera 1 without cover 2. In FIG. 3, the same components as those in FIGS. 1 and 2 are denoted by the same reference numerals.

As illustrated in FIG. 3, camera 1 includes suction cup base 11. As will be described hereinafter, camera 1 is fixed by suction to the transparent member by the negative pressure formed by suction cup base 11.

Suction cup base 11 includes lever 12. Suction cup base 11 forms a negative pressure by turning of lever 12.

In a state where lever 12 is lowered (e.g., the state of lever 12 illustrated in FIG. 4), for example, the front of camera 1 is brought into contact with the transparent member. More specifically, in the state where lever 12 is lowered, suction cup auxiliary member 5 illustrated in FIG. 1 is brought into contact with (close contact with) the transparent member. When lever 12 is turned upward to be in the state illustrated in FIG. 3 while suction cup auxiliary member 5 is brought into close contact with the transparent member, suction cup base 11 forms a negative pressure and fixes camera 1 by suction to the transparent member.

As illustrated in FIG. 3, camera 1 includes display 13. Display 13 displays an image captured by imager 4. The user of camera 1 fixes camera 1 by suction to the transparent member, for example, while checking video on display 13.

FIG. 4 is a rear side perspective view of camera 1 without cover 2. In FIG. 4, the same components as those in FIG. 3 are denoted by the same reference numerals. FIG. 4 illustrates camera 1 in a state where lever 12 is lowered.

Suction cup base 11 releases the negative pressure when lever 12 is lowered. Thus, camera 1 which is fixed by suction to the transparent member is removed from the transparent member.

Figure 5:
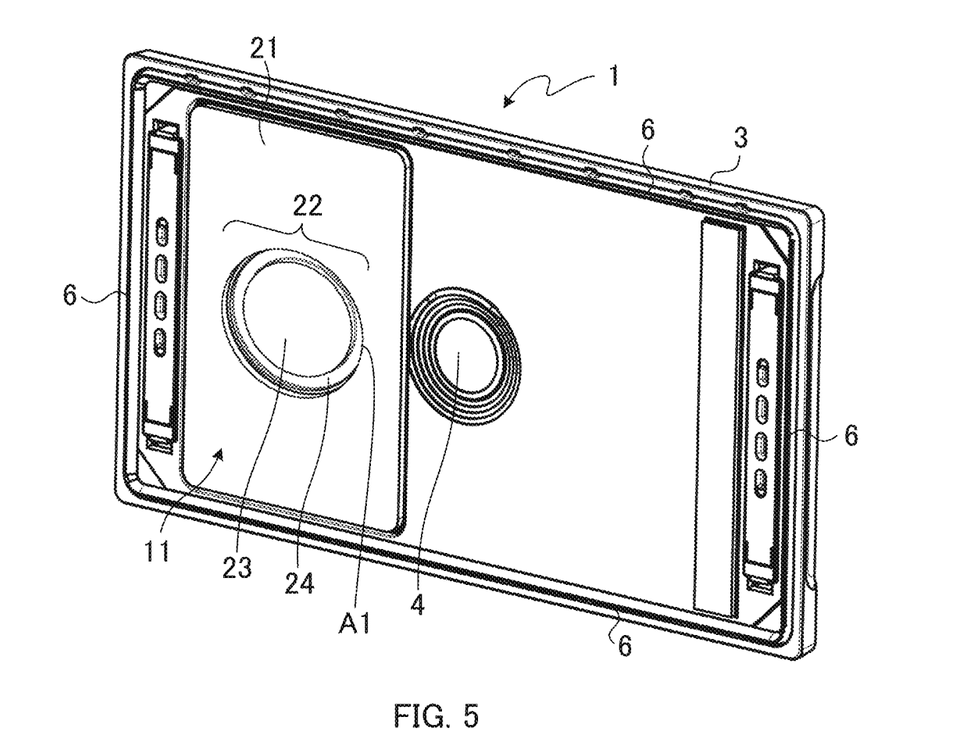
FIG. 5 is a front side perspective view of the camera without a suction cup axillary member.

FIG. 5 is a front side perspective view of camera 1 without suction cup auxiliary member 5. In FIG. 5, the same components as those in FIGS. 1 to 4 are denoted by the same reference numerals.

As illustrated in FIG. 5, suction cup base 11 includes planar portion 21 having a square shape, and suction portion 22 having a circular shape. Suction cup base 11 (planar portion 21 and suction portion 22) is formed of silicon which is harder than suction cup auxiliary member 5 illustrated in FIG. 1 and which has a hardness of 40 or greater and 70 or less, for example.

Suction cup base 11 is placed so as not to overlap with imager 4. Suction cup base 11 is placed on the left side of imager 4 as viewed from the front side of camera 1, for example.

Planar portion 21 is formed of a plate-shaped member, and the front side of planar portion 21 is flat. Planar portion 21 has opening A1 having a circular shape in a central portion of the front side of camera 1.

Suction cup auxiliary member 5 illustrated in FIG. 1 is attached to a front side surface of planar portion 21. Hole 5a of suction cup auxiliary member 5 is formed so as to be positioned on top of opening A1 of planar portion 21 when suction cup auxiliary member 5 is attached to planar portion 21. In other words, hole 5a of suction cup auxiliary member 5 overlaps with opening A1 of planar portion 21 and is thus communicated with opening A1 when suction cup auxiliary member 5 is attached to planar portion 21.

Suction portion 22 is formed in a portion of opening A1 of planar portion 21. Suction portion 22 includes movable portion 23 and coupler 24 as illustrated in FIG. 5.

Movable portion 23 is formed of a disc-shaped plate member, for example. The diameter of movable portion 23 is smaller than the diameter of opening A1 of planar portion 21.

Coupler 24 is formed concentrically on the periphery (edge) of movable portion 23 and couples between movable portion 23 and planar portion 21. Therefore, opening A1 of planar portion 21 is covered by movable portion 23 and coupler 24. More specifically, opening A1 of planar portion 21 does not penetrate through the rear surface of camera 1. Note that, coupler 24 may be referred to as a skirt portion.

Movable portion 23 moves in the normal direction of planar portion 21 in conjunction with lever 12 illustrated in FIGS. 3 and 4. When lever 12 is moved from the state in FIG. 4 to the state in FIG. 3, for example, movable portion 23 moves to the rear side of camera 1. When lever 12 is moved from the state in FIG. 3 to the state in FIG. 4, movable portion 23 moves to the front side of camera 1.

As described above, opening A1 of planar portion 21 is covered by movable portion 23 and coupler 24. When lever 12 illustrated in FIGS. 3 and 4 is moved from the state in FIG. 4 to the state in FIG. 3 while the front of camera 1 is brought into close contact with the transparent member, movable portion 23 moves to the rear side of camera 1, and a negative pressure is formed in the portion of opening A1 of planar portion 21. The negative pressure reaches the transparent member through hole 5a of suction cup auxiliary member 5 illustrated in FIG. 1. Thus, suction cup auxiliary member 5 is fixed by suction to the transparent member, and camera 1 is fixed by suction to the transparent member.

Figure 6:
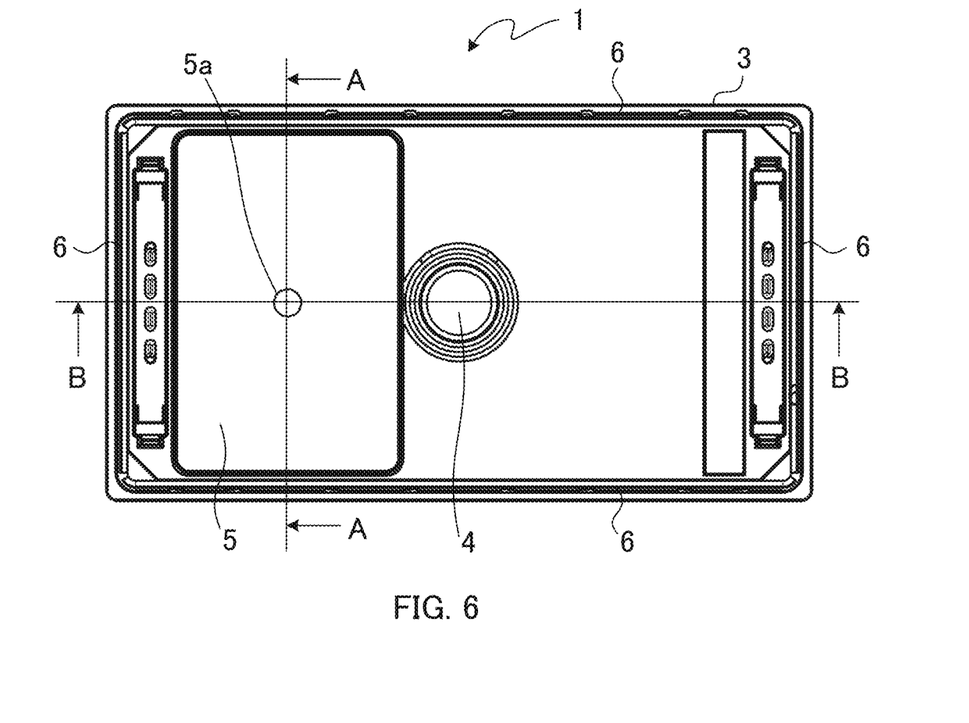
FIG. 6 is a front side view of the camera.

FIG. 6 is a front view of camera 1. In FIG. 6, the same components as those in FIG. 1 are denoted by the same reference numerals.

As illustrated in FIG. 6, suction cup auxiliary member 5 is attached to the front side surface of planar portion 21 of suction cup base 11 illustrated in FIG. 5. As described in FIG. 5, hole 5a of suction cup auxiliary member 5 overlaps with opening A1 of planar portion 21. The central axis passing through the center of hole 5a of suction cup auxiliary member 5, and the central axis passing through the center of opening A1 of planar portion 21 may coincide with each other. The diameter of hole 5a of suction cup auxiliary member 5 is smaller than the diameter of opening A1 of planar portion 21 described in FIG. 5.

Figure 7:
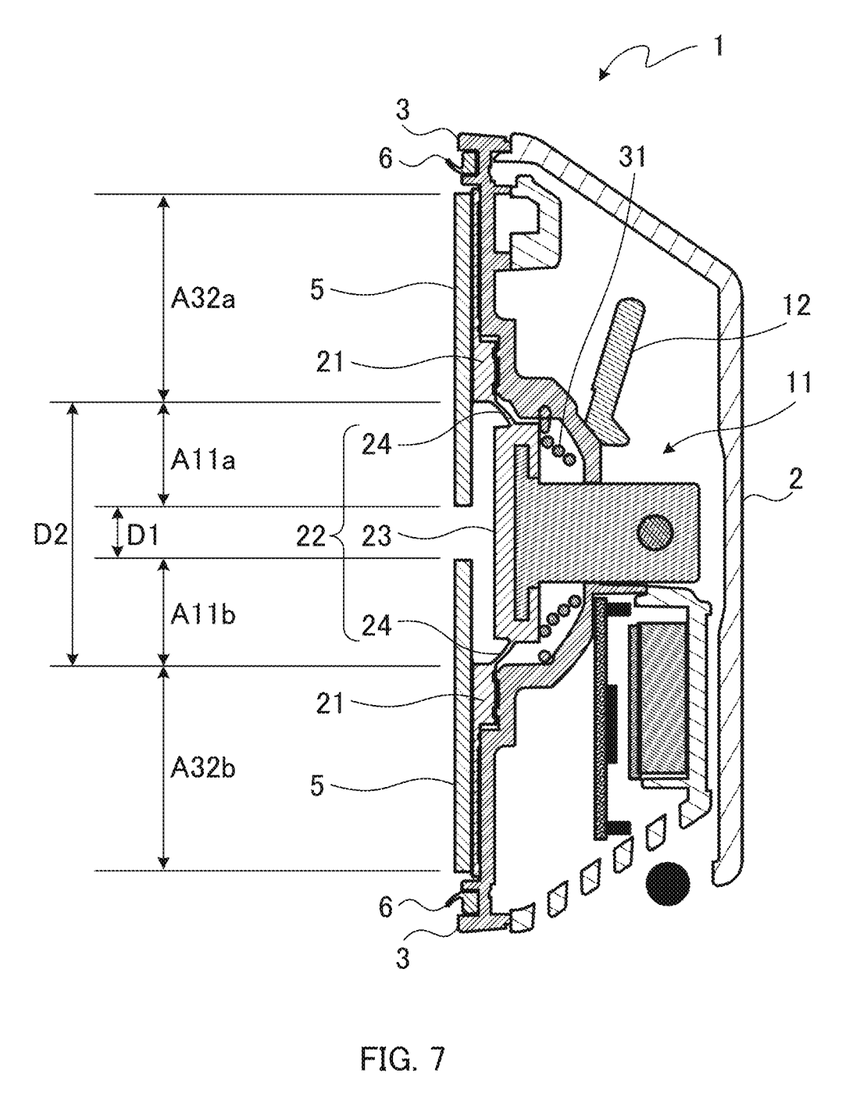
FIG. 7 is a cross-sectional view taken along the line indicated by arrows A of FIG. 6.
Figure 8:
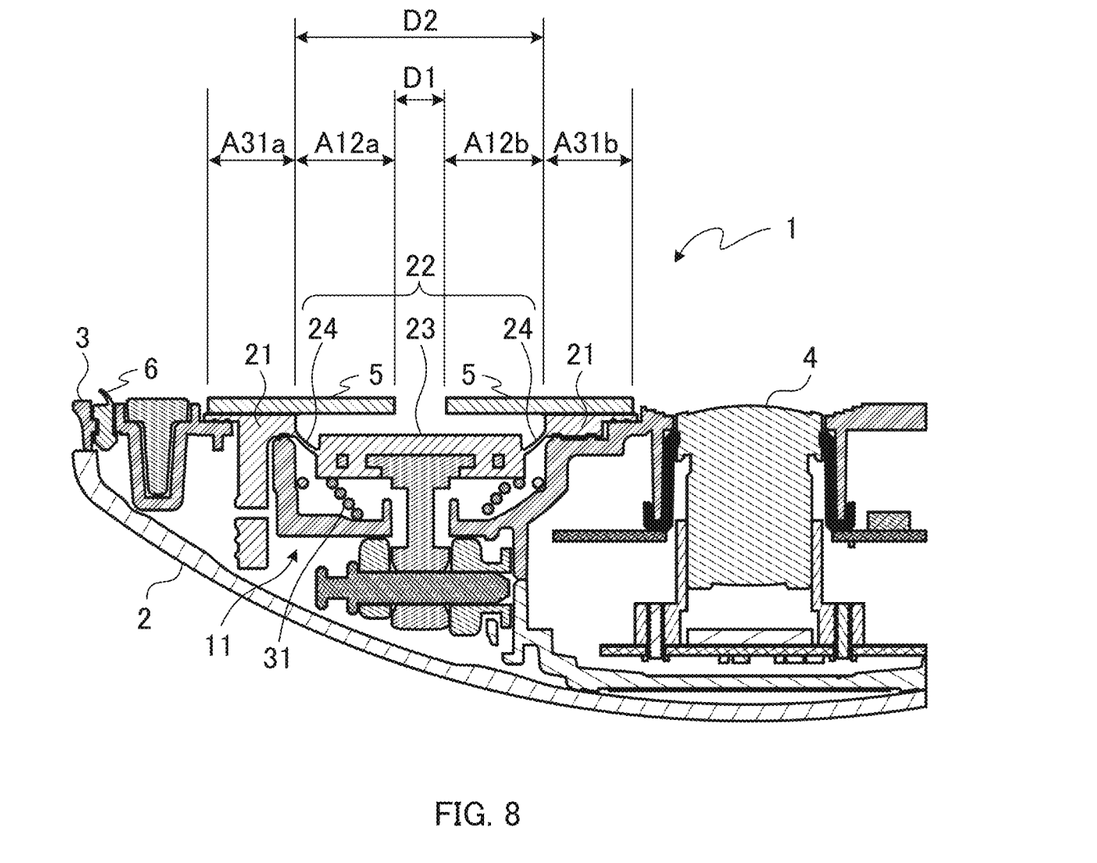
FIG. 8 is a diagram illustrating a part of a cross-sectional view taken along the line indicated by arrows B of FIG. 6.

FIG. 7 is a cross-sectional view of camera 1 of FIG. 6 taken along the line indicated by arrows A. FIG. 8 is a diagram illustrating a part of a cross section of camera 1 of FIG. 6 taken along the line indicated by arrows B. Note that, the reference numerals of hole 5a of suction cup auxiliary member 5 and opening A1 of planar portion 21 are omitted in illustrations of FIGS. 7 and 8.

Camera 1 illustrated in FIGS. 7 and 8 are in a state where movable portion 23 of suction portion 22 moves to the rear side of camera 1. In other words, camera 1 illustrated in FIGS. 7 and 8 is in a state where suction portion 22 forms a negative pressure.

As illustrated in FIGS. 7 and 8, suction cup base 11 has spring 31. Spring 31 is connected to movable portion 23 at one end and connected to casing 3 at the other end. Spring 31 expands and contracts with movement of movable portion 23.

Suction cup auxiliary member 5 is attached to an upper surface of planar portion 21 of suction cup base 11. Accordingly, when suction cup auxiliary member 5 is brought into close contact with the transparent member, planar portion 21 of suction cup base 11 comes into contact with the transparent member via suction cup auxiliary member 5 (with suction cup auxiliary member 5 interposed therebetween).

Coupler 24 having a concentric shape is formed around movable portion 23 having a circular shape, and coupler 24 having a concentric shape couples between movable portion 23 and planar portion 21. Thus, as illustrated in FIGS. 7 and 8, opening A1 of planar portion 21 does not penetrate through the rear side of camera 1.

The diameter of hole 5a of suction cup auxiliary member 5 is smaller than the diameter of opening A1 of planar portion 21. Diameter D1 of hole 5a of suction cup auxiliary member 5 illustrated in FIGS. 7 and 8 is smaller than diameter D2 of opening A1 of planar portion 21 illustrated in FIGS. 7 and 8, for example. In other words, suction cup auxiliary member 5 extends toward the center of opening A1 of planar portion 21, and thus, the area where suction cup base 11 comes into contact with the transparent member increases compared with a case without suction cup auxiliary member 5.

Lip 6 provided along the outer shape of casing 3 is formed so as to protrude on the front side of camera 1 as illustrated in FIGS. 7 and 8. Lip 6 is formed of an elastic member, such as rubber. Lip 6 formed of the elastic member is pressed when camera 1 is attached to the transparent member, and suction cup auxiliary member 5 comes into contact with the transparent member.

Figure 9:
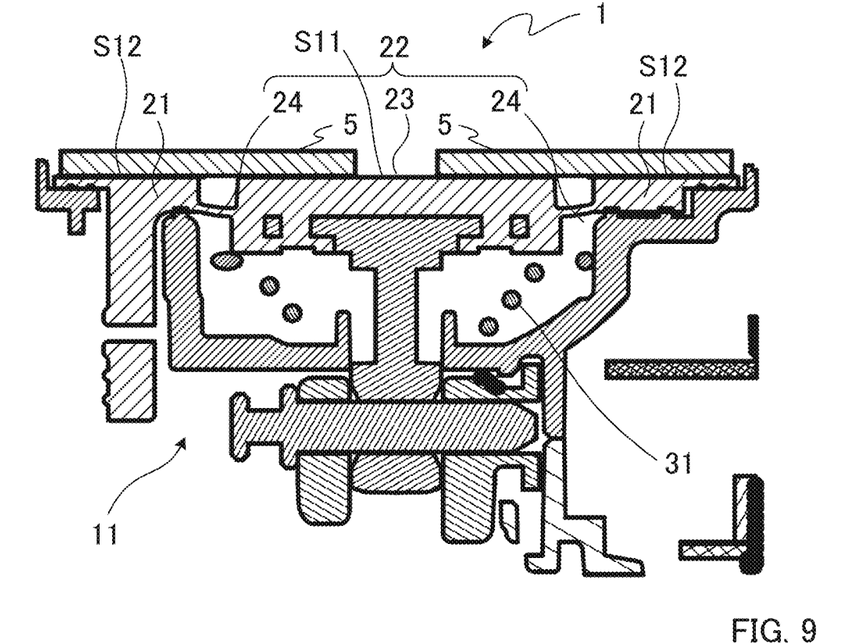
FIG. 9 is a diagram for describing a negative pressure.
Figure 10:
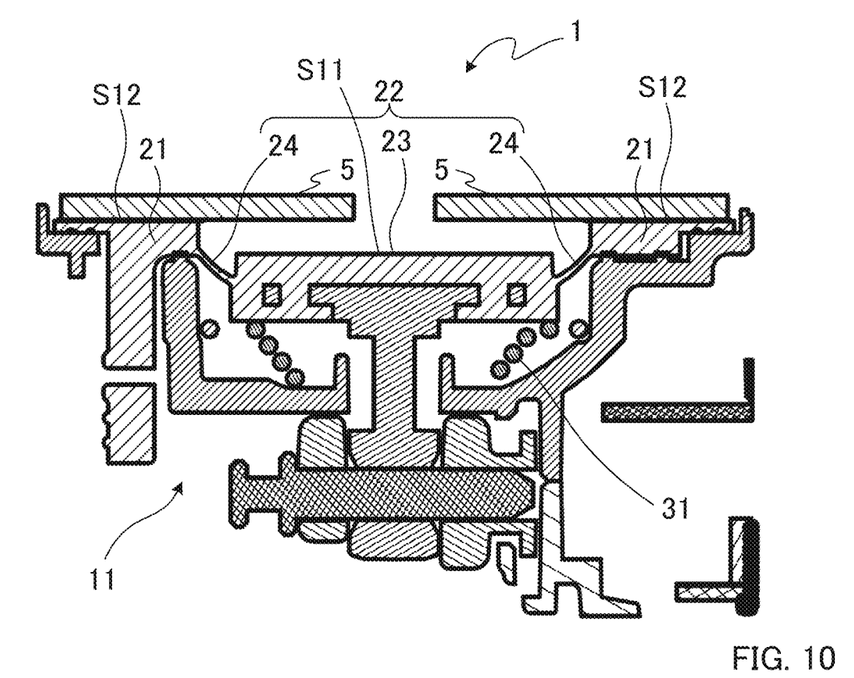
FIG. 10 is another diagram for describing a negative pressure.

FIGS. 9 and 10 are diagrams for describing a negative pressure. In FIGS. 9 and 10, the vicinity of suction portion 22 of camera 1 illustrated in FIG. 8 is illustrated. In FIGS. 9 and 10, the same components as those in FIG. 8 are denoted by the same reference numerals. Note that, FIG. 9 illustrates a state where suction portion 22 of suction cup base 11 releases the negative pressure. FIG. 10 illustrates a state where suction portion 22 of suction cup base 11 forms a negative pressure.

In a case where camera 1 is fixed by suction to the transparent member, for example, the user of camera 1 turns lever 12 illustrated in FIGS. 3 and 4 downward (sets lever 12 into the state illustrated in FIG. 4) to set movable portion 23 of suction portion 22 to be in the state illustrated in FIG. 9. As illustrated in FIG. 9, in accordance with the downward turn of lever 12, movable portion 23 is set such that surface S11 of movable portion 23 on the front side is flush with surface S12 of planar portion 21. The user of camera 1 brings suction cup auxiliary member 5 of camera 1 into close contact with the transparent member in the state illustrated in FIG. 9.

The user of camera 1 turns lever 12 illustrated in FIGS. 3 and 4 upward in a state where suction cup auxiliary member 5 of camera 1 is brought into close contact with the transparent member (sets lever 12 into the state illustrated in FIG. 3). In accordance with the upward turn of lever 12, movable portion 23 moves such that surface S11 of movable portion 23 on the front side is positioned downward relative to surface S12 of planar portion 21 as illustrated in FIG. 10. In other words, in accordance with the upward turn of lever 12, movable portion 23 moves such that surface S11 on the front side moves to the rear side of camera 1.

Thus, a space is formed between the transparent member and movable portion 23, as illustrated in FIG. 10, and a negative pressure is formed between the transparent member and movable portion 23.

Note that, when lever 12 illustrated in FIGS. 3 and 4 is turned upward (when turned from the state illustrated in FIG. 4 to the state illustrated in FIG. 3), spring 31 contracts as illustrated in FIG. 10. Spring 31 always exerts a biasing force in an extension direction. In other words, spring 31 attempts to be in the state illustrated in FIG. 9.

A description will be given of a two-layer structure including planar portion 21 and suction cup auxiliary member 5 of suction cup base 11, and of a contact area with the transparent member, as well as a thickness of coupler 24.

Regarding Two-Layer Structure of Planar Portion 21 and Suction Cup Auxiliary Member 5 of Suction Cup Base 11

For suction cup base 11, suction cup auxiliary member 5 which is softer than a material of planar portion 21 is attached to the upper surface of planar portion 21. Even in a case where the surface of the transparent member has irregularities, suction cup auxiliary member 5 which is softer than the material of planar portion 21 comes into close contact with the transparent member and suppresses entering of air. Thus, a decrease in the suction force of suction cup base 11 is suppressed.

Further, planar portion 21 which is harder than suction cup auxiliary member 5 suppresses deformation, such as curving of the surface due to the own weight of camera 1 which is fixed by suction to the transparent member, and suppresses generation of a gap between suction cup auxiliary member 5 and the transparent member. Thus, a decrease in the suction force of suction cup base 11 is suppressed.

Note that, application of a gel onto planar portion 21 without attaching suction cup auxiliary member 5 to planar portion 21 is a possibility. In general, however, the suction force of a gel decreases due to heat generated by sunlight and/or the like. Meanwhile, the amount of decrease due to heat in the suction force of suction cup auxiliary member 5 formed of silicon and/or the like is less than that of gel, and thus, suction cup auxiliary member 5 formed of silicon and/or the like can suppress a decrease in the suction force of suction cup base 11.

Regarding Contact Area with Transparent Member

Hole 5a of suction cup auxiliary member 5 is placed at a position overlapping with opening A1 of planar portion 21. Further, the diameter of hole 5a of suction cup auxiliary member 5 is smaller than the diameter of opening A1 of planar portion 21. Therefore, the contact area between suction cup base 11 to which suction cup auxiliary member 5 is attached, and the transparent member is larger than the contact area between suction cup base 11 of a case where suction cup auxiliary member 5 is not attached, and the transparent member.

As illustrated by arrows A11a and A11b of FIG. 7 and arrows A12a and A12b of FIG. 8, suction cup auxiliary member 5 extends toward the center of opening A1 of planar portion 21, for example. Thus, the contact area of suction cup base 11 with the transparent member increases compared with the case where suction cup auxiliary member 5 is not attached to planar portion 21.

The increase in the contact area with the transparent member suppresses a decrease in the suction force of suction cup base 11. The path of the air flowing from the edge of suction cup auxiliary member 5, for example, increases in length by the amount of the length of the portion extended by suction cup auxiliary member 5 as indicated by arrows A11a and A11b of FIG. 7 and arrows A12a and A12b of FIG. 8. The increase in length of the path from which the air enters makes it hard for the air to enter the portion where the negative pressure is formed, and thus, a decrease in the suction force of suction cup base 11 is suppressed.

Further, as illustrated in FIG. 5, for example, in suction cup base 11 which is vertically long, the distance from a horizontal edge of planar portion 21 to opening A1 is short compared with the distance from a vertical edge to opening A1. The distance indicated by arrows A31a and A31b of FIG. 8, for example, is smaller than the distance indicated by arrows A32a and A32b of FIG. 7.

As described above, although suction cup base 11 is vertically long and the distance from the horizontal edge of planar portion 21 to opening A1 is small, the distance to the portion where a negative pressure is formed (e.g., the distance indicated by arrows A12a and A12b of FIG. 8) is extended by suction cup auxiliary member 5, and thus, the path through which the air enters can be long. The same applies to the case where suction cup base 11 is horizontally long.

Regarding Thickness of Coupler 24

Coupler 24 expands and contracts in thickness in accordance with movement of movable portion 23. Thus, for example, when movable portion 23 moves to the rear side of camera 1, the edge of opening A1 of planar portion 21 is pulled to the rear side of camera 1 by coupler 24, and thus, suction cup auxiliary member 5 can be suppressed from being detached from the transparent member. Accordingly, since suction cup auxiliary member 5 is suppressed from being detached from the transparent member, the air hardly enters the portion where the negative pressure is formed, and thus, a decrease in suction force is suppressed.

Further, expansion and contraction of coupler 24 in accordance with movement of movable portion 23 suppresses, relative to the transparent member, movement of suction cup auxiliary member 5 in close contact with the transparent member, thereby making it possible to suppress generation of wrinkles on the surface of suction cup auxiliary member 5. The suppression of generation of wrinkles on the surface of suction cup auxiliary member 5 makes it hard for the air to enter the portion where the negative pressure is formed, and thus, a decrease in suction force is suppressed in suction cup base 11.

Note that, reducing coupler 24 in thickness excessively causes movable portion 23 to move in a direction other than the normal direction of planar portion 21, and causes unstable positioning. Thus, coupler 24 has a predetermined value or greater for the thickness that does not allow movement of movable portion 23 in a direction other than the normal direction of planar portion 21.

A description will be given of examples of sizes of the respective portions. The thickness of suction cup auxiliary member 5 may be, for example, 1.0 mm or greater and 1.5 mm or less. The diameter of hole 5a of suction cup auxiliary member 5, for example, may be 3 mm or greater and 10 mm or less, and for example, may be 5 mm, depending on the size of suction cup auxiliary member 5.

The diameter of opening A1 of planar portion 21, for example, may be 20 mm or greater and 40 mm or less, and for example, may be 30 mm, depending on the size of planar portion 21. The moving width of movable portion 23, for example, may be 1.0 mm or greater and 2.0 mm or less, and for example, may be 1.5 mm. The thickness of coupler 24, for example, may be 0.5 mm or greater and 1 mm or less.

As described above, camera 1 fixed by suction to a transparent member and captures an image through the transparent member includes: suction cup base 11 including planar portion 21 having opening A1; and suction portion 22 which forms a negative pressure in opening A1 of planar portion 21. Camera 1 includes suction cup auxiliary member 5 attached to a surface of planar portion 21, including hole 5a formed in a portion corresponding to opening A1 of planar portion 21 and being brought into contact with the transparent member. Suction cup auxiliary member 5 is softer than the material of planar portion 21.

Thus, camera 1 can suppress a decrease in suction force with respect to the transparent member. Suction cup auxiliary member 5 softer than the material of planar portion 21, for example, comes into close contact with the transparent member and suppresses entry of air even when the surface of the transparent member has irregularities. Thus, camera 1 can suppress a decrease in suction force with respect to the transparent member. Further, planar portion 21 harder than suction cup auxiliary member 5 suppresses deformation, such as curving of the surface due to the own weight of camera 1 fixed by suction to the transparent member, and suppresses generation of a gap between suction cup auxiliary member 5 and the transparent member. Thus, camera 1 can suppress a decrease in suction force with respect to the transparent member.

Note that, a camera without suction cup auxiliary member 5 has decreased in suction force, shifted in its installation position with respect to the transparent member, and fallen off in a few days, whereas camera 1 has neither shifted in its installation position with respect to the transparent member nor fallen off in a few months.

(Variation 1)

Figure 11:
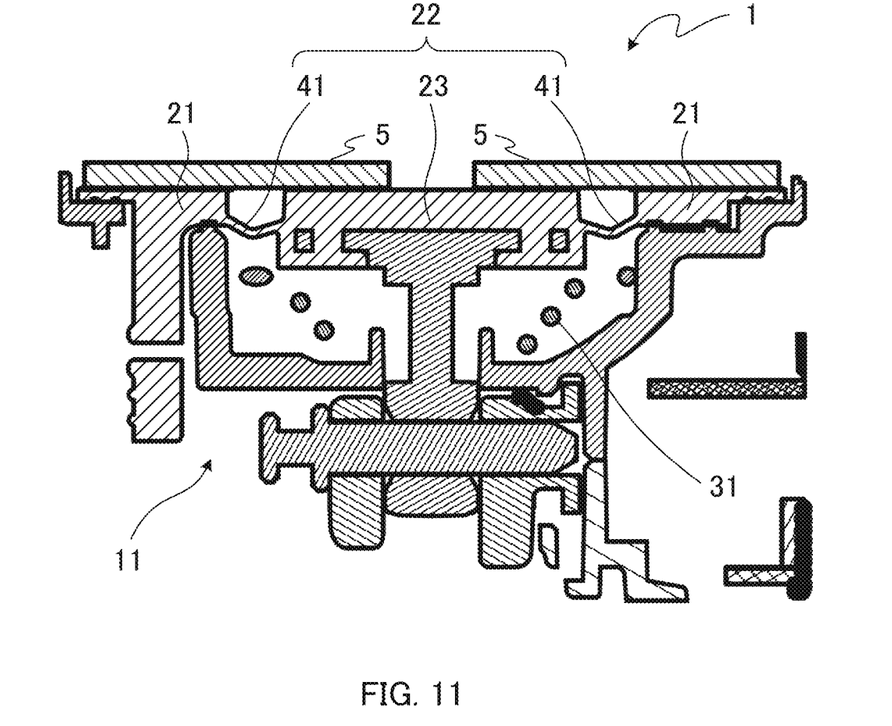
FIG. 11 is a diagram for describing another example of a coupler.

FIG. 11 is a diagram for describing another example of coupler 24. In FIG. 11, the same components as those in FIG. 9 are denoted by the same reference numerals.

As illustrated in FIG. 11, coupler 41 is bent to the rear side of camera 1. Coupler 41 extends linearly when movable portion 23 moves to the rear side of camera 1.

As described above, coupler 41 has a bent shape. Thus, suction cup base 11 suppresses detachment of suction cup auxiliary member 5 from the transparent member and suppresses entry of air into opening A1. Further, suction cup base 11 suppresses generation of wrinkles on the surface of suction cup auxiliary member 5 and suppresses entry of air into opening A1.

Note that, coupler 41 has a shape including a single bent portion, but is not limited to this shape. Coupler 41 may have a shape including multiple bent portions in an accordion-fold shape.

(Variation 2)

Figure 12:
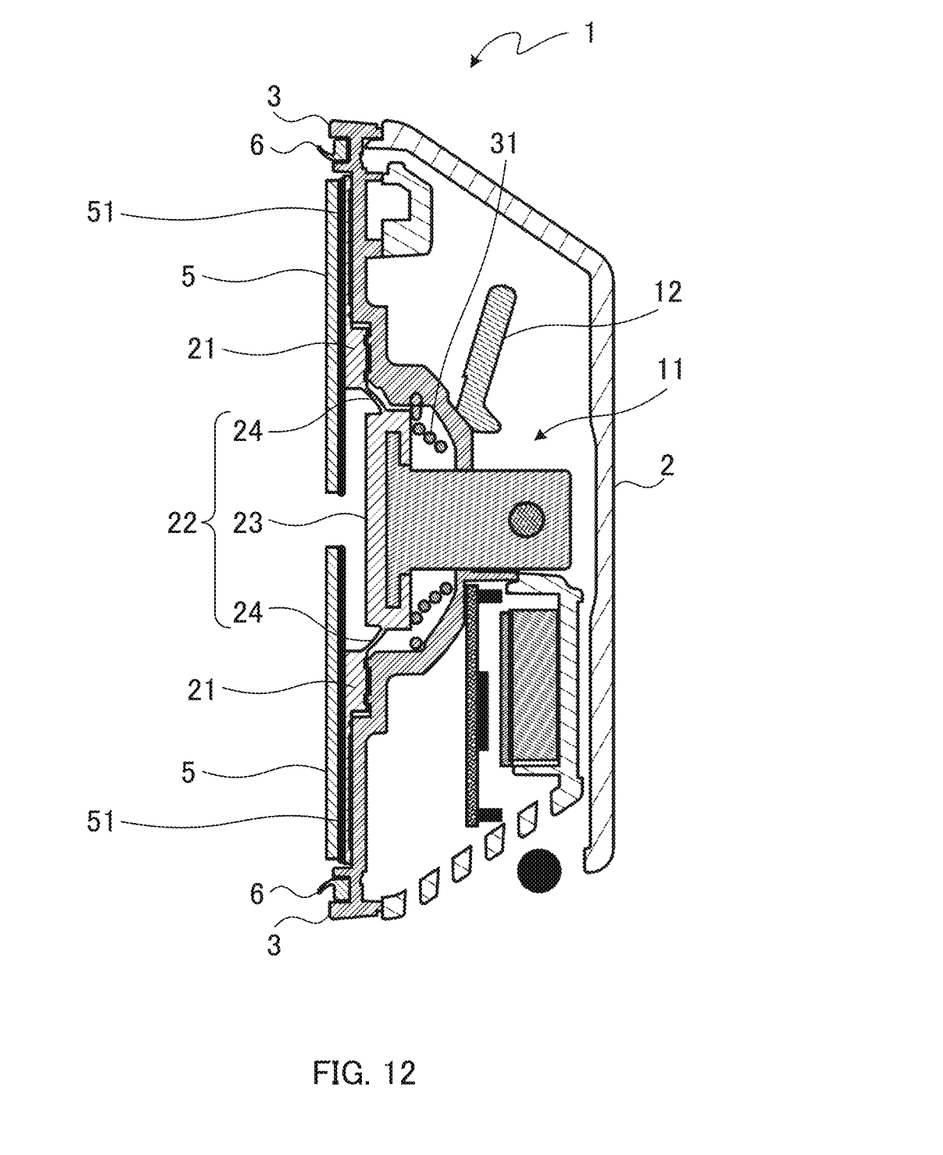
FIG. 12 is a cross-sectional view taken along the line indicated by arrows A of FIG. 6.

FIG. 12 is a cross-sectional view of camera 1 of FIG. 6 taken along the line indicated by arrows A. In FIG. 12, the same components as those in FIG. 7 are denoted by the same reference numerals.

As illustrated in FIG. 12, camera 1 has sheet 51 having a plate shape. Sheet 51 is formed of a material harder than suction cup auxiliary member 5. Sheet 51 may be, for example, a resin sheet formed of poly carbonate (PO) and/or the like. The thickness of sheet 51 may be, for example, 0.5 mm. Further, the thickness of sheet 51 may be 0.2 mm or greater and 0.5 mm or less.

Sheet 51 has, for example, the same shape as suction cup auxiliary member 5, and includes a hole at a position corresponding to hole 5a of suction cup auxiliary member 5. Sheet 51 is attached to the rear side of suction cup auxiliary member 5. In other words, sheet 51 is attached to a surface of suction cup auxiliary member 5 opposite to the surface to be in contact with the transparent member. In other words, sheet 51 is inserted between suction cup auxiliary member 5 and suction cup base 11.

As described above, sheet 51 which is harder than suction cup auxiliary member 5 may be placed between suction cup auxiliary member 5 and suction cup base 11. Thus, sheet 51 suppresses deformation, such as curving of the contact surface due to its own weight of camera 1 fixed by suction to the transparent member, and suppresses generation of a gap between suction cup auxiliary member 5 and the transparent member. Accordingly, a decrease in the suction force of suction cup base 11 is suppressed.

(Other Variations)

The shapes of hole 5a, opening A1, and movable portion 23 are not limited to a circular shape. The shapes of hole 5a, opening A1, and movable portion 23 may be, for example, an elliptical shape or a polygonal shape, such as a square shape.

Suction cup base 11 is placed on the left side of imager 4 when viewed from the front side of camera 1, but the position where suction cup base 11 is placed is not limited to this position. Suction cup base 11 may be placed on the right side of imager 4 when viewed from the front side of camera 1. Further, suction cup base 11 may be placed on both the left and right sides of imager 4 when viewed from the front side of the camera 1. Suction cup base 11 may be placed on both the upper and lower sides of imager 4 or on one of the upper and lower sides when viewed from the front side of camera 1.

Application of a suction cup apparatus including suction cup auxiliary member 5 and suction cup base 11 is not limited to camera 1. The suction cup apparatus may be applied to, for example, a suction cup hook for hanging a bag or the like which is attached by suction to a planar member, such as a window or a wall. The planar member may or may not be transparent.

The outer shape of suction cup base 11 as viewed from the front of suction cup base 11 is not limited to a rectangle. The outer shape of suction cup base 11 as viewed from the front may be, for example, a circular shape, an elliptical shape, or a polygonal shape, such as a square shape.

Suction cup auxiliary member 5 may be formed of silicon having viscosity.

The description has been given of an embodiment with reference to the drawings, but the present disclosure is not limited to the examples. It is apparent that variations or modifications in the category described in the claims may be conceived of by a person skilled in the art. It is to be understood that such variations or modifications fall within the technical scope of the present disclosure. In addition, component elements in the embodiment may be optionally combined without departure from the spirit of the present disclosure.

INDUSTRIAL APPLICABILITY

The present disclosure is used in cameras installed so as to be attached by suction to window glasses, and configured to capture images through window glasses.

REFERENCE SIGNS LIST

1 Camera
2 Cover
3 Casing
4 Imager

5 Suction cup auxiliary member
5a Hole
6 Lip
11 Suction cup base
12 Lever
21 Planar portion
22 Suction cup portion
23 Movable part
31 Spring
41 Coupler
A1 Opening

The invention claimed is:

1. A camera fixed by suction to a transparent member and configured to capture an image through the transparent member, the camera comprising:
 a planar portion having an opening;
 an auxiliary member attached to a surface of the planar portion and including a hole formed therein, the hole communicating with the opening of the planar portion, the auxiliary member having a plate shape and being brought into contact with the transparent member; and
 a suction portion causing the auxiliary member to be attached by suction to the transparent member by forming a negative pressure in the opening of the planar portion, wherein
 the auxiliary member is softer than a material of the planar portion.

2. The camera according to claim 1, wherein the hole of the auxiliary member has a diameter smaller than a diameter of the opening of the planar portion.

3. The camera according to claim 1, wherein the auxiliary member is formed of silicon having a hardness of 5 or greater and 20 or less.

4. The camera according to claim 1, wherein the planar portion is formed of silicon having a hardness of 50 or greater and 70 or less.

5. The camera according to claim 1, wherein the suction portion includes:
 a movable portion that is movable in a normal direction of the planar portion; and
 a coupler that extends from an edge of the movable portion toward the planar portion and couples between the movable portion and the planar portion.

6. The camera according to claim 5, wherein the coupler has a thickness of 0.5 mm or greater and 1 mm or less.

7. The camera according to claim 5, wherein the coupler has a bent shape.

8. The camera according to claim 1, wherein the auxiliary member has a surface to which a sheet harder than the auxiliary member is attached, the surface being opposite to a surface of the auxiliary member to be brought into contact with the transparent member, the sheet having a hole communicating with the opening of the planar portion and formed in the sheet.

9. A suction cup apparatus fixed by suction to a planar member, the suction cup apparatus comprising:
 a planar portion having an opening;
 an auxiliary member attached to a surface of the planar portion and including a hole formed therein, the hole communicating with the opening of the planar portion, the auxiliary member having a plate shape and being brought into contact with the planar member; and
 a suction portion causing the auxiliary member to be attached by suction to the planar member by forming a negative pressure in the opening of the planar portion, wherein
 the auxiliary member is softer than a material of the planar portion.

* * * * *